(12) United States Patent
Kobayashi (10) Patent No.: US 10,583,812 B2
(45) Date of Patent: Mar. 10, 2020

(54) CAB OF WORK VEHICLE AND WORK VEHICLE

(71) Applicant: Komatsu Ltd., Tokyo (JP)

(72) Inventor: Takaya Kobayashi, Tokyo (JP)

(73) Assignee: Komatsu Ltd., Tokyo (JP)

( * ) Notice: Subject to any disclaimer, the term of this patent is extended or adjusted under 35 U.S.C. 154(b) by 226 days.

(21) Appl. No.: 15/747,264

(22) PCT Filed: Jul. 20, 2017

(86) PCT No.: PCT/JP2017/026260
§ 371 (c)(1),
(2) Date: Jan. 24, 2018

(87) PCT Pub. No.: WO2019/016914
PCT Pub. Date: Jan. 24, 2019

(65) Prior Publication Data
US 2019/0023233 A1    Jan. 24, 2019

(51) Int. Cl.
*B60S 1/56* (2006.01)
*B60S 1/24* (2006.01)
*E02F 9/08* (2006.01)
*B60S 1/04* (2006.01)
*B60S 1/28* (2006.01)
(Continued)

(52) U.S. Cl.
CPC ............ *B60S 1/566* (2013.01); *B60R 3/005* (2013.01); *B60S 1/0452* (2013.01); *B60S 1/245* (2013.01); *B60S 1/28* (2013.01); *B62D 33/06* (2013.01); *E02F 9/0858* (2013.01); *E02F 9/0866* (2013.01); *E02F 9/16* (2013.01);
(Continued)

(58) Field of Classification Search
CPC .......... B60S 1/566; B60S 1/0452; B60S 1/28; B62D 33/0617; E02F 9/16
See application file for complete search history.

(56) References Cited

U.S. PATENT DOCUMENTS 4,141,102 A  *  2/1979  Lawrence ............. B60S 1/0466
                                                    15/250.16
8,806,699 B2 *  8/2014  Ohnishi .................... B60S 1/06
                                                    15/250.3
(Continued)

FOREIGN PATENT DOCUMENTS

CN      102470823 A      5/2012
CN      103403267 A     11/2013
(Continued)

*Primary Examiner* — Jason S Morrow
(74) *Attorney, Agent, or Firm* — Locke Lord LLP (57) ABSTRACT

A cab of a work vehicle includes a front windshield that extends in a vehicle width direction; front lateral windshields that extends diagonally rearward and is connected to both sides of the front windshield in the vehicle width direction via ridgelines, and a rear-end edge of each front lateral windshield extending in a vertical direction being gradually separated from the ridgeline of each front lateral windshield while extending downward; a front lateral wiper that is disposed so as to be rotatable around an upper axis that is disposed above each front lateral windshield and so as to be rotatable along each front lateral windshield; an upper drive device that is configured to reciprocally rotate the front lateral wiper around the upper axis between a rear position in and a front position.

20 Claims, 6 Drawing Sheets (51) Int. Cl.
  *B60R 3/00*  (2006.01)
  *B62D 33/06*  (2006.01)
  *E02F 9/16*  (2006.01)
  *B60S 1/34*  (2006.01)
  *B62D 25/12*  (2006.01)

(52) U.S. Cl.
  CPC ............ *B60S 1/3402* (2013.01); *B62D 25/12* (2013.01); *B62D 33/0617* (2013.01)

(56) References Cited

U.S. PATENT DOCUMENTS

| | | | |
|---|---|---|---|
| 9,193,395 B2 * | 11/2015 | Kitashou | ............ B62D 33/0604 |
| 2007/0200389 A1 | 8/2007 | Ina et al. | |
| 2010/0109380 A1 | 5/2010 | Jorgensen | |
| 2010/0156144 A1 * | 6/2010 | Iwakata | ............. B62D 33/0617 |
| | | | 296/190.1 |
| 2012/0138090 A1 | 6/2012 | Bichler | |
| 2014/0013535 A1 | 1/2014 | Natsume | |
| 2014/0217779 A1 * | 8/2014 | Gielda | ................... B60R 21/13 |
| | | | 296/190.03 |
| 2015/0000996 A1 | 1/2015 | Nagami et al. | |
| 2015/0298748 A1 * | 10/2015 | Kitashou | ............ B62D 33/0604 |
| | | | 296/190.08 |
| 2018/0044884 A1 * | 2/2018 | Tsutsumi | .................. B60R 3/02 |

FOREIGN PATENT DOCUMENTS

| | | |
|---|---|---|
| CN | 103538564 A | 1/2014 |
| JP | 59-182449 U | 12/1984 |
| JP | 2003-191827 A | 7/2003 |
| JP | 2006-036002 A | 2/2006 |
| JP | 2013-501680 A | 1/2013 |
| KR | 100764722 B1 | 10/2007 |
| WO | 2006/012964 A1 | 2/2006 |
| WO | 2011/019305 A1 | 2/2011 |

* cited by examiner

CAB OF WORK VEHICLE AND WORK VEHICLE

CROSS REFERENCE TO RELATED APPLICATIONS

This application is related to co-pending application: "WORK VEHICLE" filed even date herewith in the names of Takaya KOBAYASHI and Hirofumi MIYAMOTO as a national phase entry of PCT/JP2017/026266, which application is assigned to the assignee of the present application and is incorporated by reference herein.

TECHNICAL FIELD OF THE INVENTION

The present invention relates to a work vehicle.

DESCRIPTION OF THE RELATED ART

Patent Document 1 discloses a wheel loader as an example of the work vehicle and the wheel loader including a cab having a front-part window. The front-part window has a front windshield extending in a vehicle width direction and a front lateral windshield connected to both sides in the vehicle width direction of the front windshield via ridgelines. The front lateral windshield extends diagonally rearward from the ridgeline. The front lateral windshield has a shape gradually spreading downward.

PRIOR ART DOCUMENT

Patent Document

[Patent Document 1] Japanese Unexamined Patent Application, First Publication No. 2006-36002

BRIEF SUMMARY OF THE INVENTION

Problems to be Solved by the Invention

In order to improve workability of an operator of the wheel loader, it is preferable to be able to secure good visibility even in rainy weather or in the environment easy to adhere dust. In particular, visibility through the front lateral windshield in which line of sight of the operator frequently concentrates during excavating work to remove sediment is important for improving workability together with visibility of the front windshield. The present invention has been made in view of such problems, and an object of the present invention is to provide a cab of a work vehicle and the work vehicle provided therewith with improved visibility for an operator via a front lateral windshield thereof.

Means for Solving the Problem

An aspect of the present invention provides a cab of the work vehicle, an inside of the cab is a cockpit, and the cab includes: a front windshield that extends in a vehicle width direction; front lateral windshields that extend diagonally rearward and are connected to both sides of the front windshield in the vehicle width direction via ridgelines, and a rear-end edge of each front lateral windshield extending in a vertical direction being gradually separated from the ridgeline of each front lateral windshield while extending downward; a front lateral wiper that is disposed so as to be rotatable around an upper axis that is disposed above each front lateral windshield and so as to be rotatable along each front lateral windshield, and that is configured to wipe each front lateral windshield; an upper drive device that is configured to reciprocally rotate the front lateral wiper around the upper axis between a rear position in which the front lateral wiper extends along the rear-end edge and a front position in which the front lateral wiper extends along the ridgeline.

Another aspect of the present invention provides a work vehicle including: a vehicle body having the cab of the work vehicle, and a work equipment provided on a forward side of the cab in the vehicle body.

Effects of the Invention

According to the cab of the work vehicle and the work vehicle of the above embodiment, it is possible to improve visibility for the operator via the front lateral windshield.

DETAILED DESCRIPTION OF THE INVENTION

Hereinafter, an embodiment of a wheel loader which is an example of a work vehicle according to the present invention will be described in detail with reference to the drawings.

<Work Vehicle>

Figure 1:
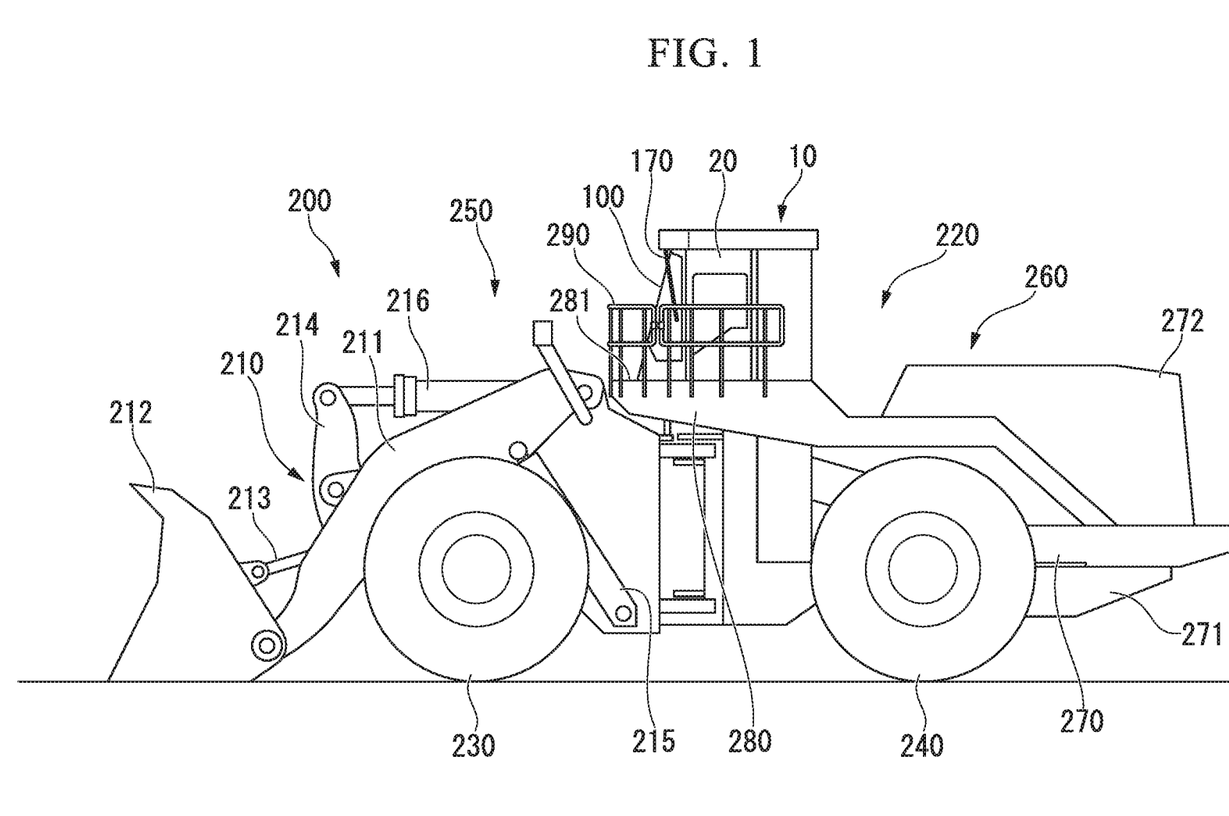
FIG. 1 is a side view of a wheel loader as a work vehicle according to an embodiment of the present invention.

As shown in FIG. 1, a wheel loader 200 as the work vehicle includes a work equipment 210 and a vehicle body 220. In the following description, front and back directions of the wheel loader 200, a front direction of the wheel loader 200, a rear direction of the wheel loader 200, and a width direction of the wheel loader 200 may be simply referred to as "front-rear directions", "forward", "rearward" and "vehicle width direction", respectively, in some cases. The vehicle width directions may be referred to as "right side" or "left side" in some cases. A direction toward a center of the wheel loader 200 in the vehicle width direction may be referred to as "inward in a vehicle-width direction", and directions toward a right side or left side from the center of the wheel loader 200 in the vehicle width direction may be referred to as "outward in a vehicle-width direction". A vertical direction, an upward direction, and a downward direction of the wheel loader 200 in a state where the wheel loader 200 is disposed on a horizontal plane may be simply referred to as "vertical direction", "upward", and "downward" in some cases.

<Work Equipment>

The work equipment 210 is provided in a front part of the vehicle body 220. The work equipment 210 includes a boom 211 and a bucket 212. The boom 211 is rotatably connected to the vehicle body 220. The bucket 212 is connected to one end of a bell crank 214 via a link 213. A bucket drive cylinder 216 is connected to the other end of the bell crank 214. The bucket 212 is rotatably connected to the tip of the boom 211. The boom 211 is driven by a boom driving cylinder 215, and the bucket 212 is driven by the bucket drive cylinder 216. The boom driving cylinder 215 and the bucket drive cylinder 216 are driven by hydraulic pressure supplied via the hydraulic circuit.

<Vehicle Body>

The vehicle body 220 includes a vehicle front portion 250, a vehicle rear portion 260, front wheels 230, rear wheels 240, and a cab 10.

The vehicle front portion 250 constitutes the front part of the vehicle body 220. The vehicle equipment 210 is provided in the vehicle front portion 250 of the vehicle body 220. The vehicle rear portion 260 constitutes the rear part of the vehicle body 220. Since the vehicle front portion 250 and the vehicle rear portion 260 are connected around an axis extending in the vertical direction, the vehicle front portion 250 and the vehicle rear portion 260 are mutually rotatable in the horizontal direction. A pair of front wheels 230 is provided on the vehicle front portion 250 so as to be separated from each other in the vehicle width direction. A pair of rear wheels 240 is provided on the vehicle rear portion 260 so as to be separated from each other in the vehicle width direction. By driving the front wheels 230 and the rear wheels 240, the vehicle body 220 moves forward and rearward.

The vehicle rear portion 260 includes a rear frame 270, a fuel tank 271, an engine room 272, a passage forming portion 280, and a passage fence 290.

The rear frame 270 is a member extending in the front-rear directions, and a pair of rear frames is provided in parallel with a distance in the width direction.

The fuel tank 271 is provided below a rear part of the vehicle rear portion 260, and fuel is reserved.

The engine room 272 is provided above a rear part of the rear frame 270. Inside the engine room 272, an engine driven by supplying the fuel, a cooling unit for cooling the engine, and the like, are provided. The output of the engine is transmitted to hydraulic equipment such as a hydraulic pump and a torque converter (not shown) to operate the work equipment 210 and the axle device.

The passage forming portion 280 is provided above a front portion of the rear frame 270. The passage forming portion 280 is formed in U-shape in which a forward part is close and a rearward part is open, in a plan view. An upper surface of the passage forming portion 280 is a front passage 281. The front passage 281 is formed in a U-shape in a plan view as similar to the passage forming portion 280.

The passage fence 290 is fixed to the passage forming portion 280. The passage fence 290 rises upward from an outer edge of the front passage 281 and is provided so as to extend along the outer edge of the front passage 281.

<Cab>

Hereinafter, the cab 10 will be described in detail with reference to FIGS. 2 and 3.

The cab 10 is provided above a front part of the rear frame 270 so as to be surrounded by the passage forming portion 280 from a circumference of the cab. The front passage 281 on the passage forming part 280 is used when the operator gets into the cab 10 or when the operator performs maintenance on the cab 10.

The cab 10 includes a cab body 20, a front-part window 100, a front wiper 130, a lower drive device 160, a front lateral wiper 170, and an upper drive device 180.

<Cab Body>

The inside of the cab body 20 is a cockpit for the operator. The cab body 20 has a box shape in which a forward part is opened. The cab body 20 includes a support structure 30, a ceiling 40, a detachable cover 55, a front support post 58, a lateral panel 60, and front cover 70.

The support structure 30 constitutes a rear part of the cab 10 and has the role of fixing and supporting the cab 10 to the rear frame 270 and a role of protecting the operator by securing an internal space of the cockpit even if the cab 10 receives an impact from an outside. The support structure 30 has the role of protecting the operator in the cockpit from a rear of the cockpit. The support structure 30 includes a rear support post 31 and a rear cross beam 32 as shown in FIG. 3.

The rear support post 31 is a pillar-shaped member extending upward and a left-right pair of rear support posts 31 is provided with a distance in the vehicle width direction. A lower part of the rear support post 31 is fixed to the rear frame 270. The pair of rear support posts 31 extends in parallel with each other and each rear support 31 extends upward from a portion fixed to the rear frame 270.

The rear cross beam 32 is a member extending in the vehicle width direction and a pair of rear cross beams 32 is provided so as to connect the upper ends of the pair of rear support posts 31 in the vehicle width direction.

In addition, a rear panel (not shown) extending in the vehicle width direction and the vertical direction is provided at rear portions of the pair of rear support posts 31 and the rear cross beam 32. The rear panel partitions the cockpit from a rear of the cockpit.

<Ceiling>

The ceiling 40 partitions the cockpit from above. As shown in FIG. 3, the ceiling 40 includes a ceiling structure 41, a ceiling board 45, and a ceiling cover 50.

<Ceiling Structure>

The ceiling structure 41 is a framework of the ceiling 40 and is provided so as to protrude from an upper part of the support structure 30 toward the forward side of the support structure 30. The ceiling structure 41 has the role of protecting the operator in the cockpit from above. The ceiling structure 41 includes, for example, a side vertical beam 42, a front cross beam 43, and a front vertical beam 44.

The side vertical beam 42 is a member extending in the front-rear directions, and a pair of side vertical beams 42 is provided with a distance in the vehicle width direction. A rear end of each side vertical beam 42 is integrally fixed to the corresponding upper end of the rear support post 31. The pair of side vertical beams 42 extends in parallel with each other and extends forward from a portion fixed to the corresponding rear support post 31.

The front cross beam 43 is a member extending in the vehicle width direction and is provided so as to connect the front ends of the pair of side vertical beams 42 in the vehicle width direction. The front cross beam 43 is provided in parallel with the rear cross beam 32 and at the same vertical position as the rear cross beam 32.

The front vertical beam 44 is a member extending in the front-rear directions, and a pair of front vertical beams 44 is provided with a distance in the vehicle width direction. A rear end of each front vertical beam 44 is integrally fixed to the front cross beam 43.

The front vertical beams 44 extend in parallel with each other and each extend forward from a portion fixed to the front cross beam 43. The portion fixed to the front cross beam 43 in the front vertical beam 44 is set at a portion inward in the vehicle-width direction as compared with ends outward in the vehicle-width direction of the front cross beam 43. The pair of front vertical beams 44 is provided inward in the vehicle-width direction as compared with the pair of side vertical beams 42. A distance between the pair of front vertical beams 44 in the vehicle width direction is smaller than a distance between the pair of side vertical beams 42 in the vehicle width direction. The front vertical beam 44 is provided in parallel with the side vertical beam 42 and at the same vertical position as the side vertical beam 42.

The ceiling board 45 has a plate shape extending along the horizontal plane. The ceiling board 45 is provided under the ceiling structure 41. The ceiling board 45 is integrally fixed to lower surfaces of the side vertical beams 42, the front cross beam 43, and the front vertical beams 44.

A side edge portion 46 which is an end outward in the vehicle-width direction of the ceiling board 45 is formed so as to extend in the front-rear directions along an outer edge outward in the vehicle-width direction of the side vertical beam 42. A front edge portion 47 which is an end of the ceiling board 45 at a forward side of the vehicle is formed so as to extend in the vehicle width direction along the front ends of the pair of front vertical beams 44. An end outward in the vehicle-width direction of the front edge portion 47 of the ceiling board 45 and the front end of the side edge portion 46 of the ceiling board 45 are connected by an inclined edge portion 48. The inclined edge portion 48 extends so as to incline outward in the vehicle-width direction while extending rearward side. That is, the ceiling board 45 has a shape in which a corner portion positioned forward of the vehicle and outward in the vehicle-width direction is diagonally cut out. The inclined edge portion 48 is formed outward in the vehicle-width direction of the vertical beam 44 and formed forward side of the side vertical beam 42.

<Ceiling Cover>

The ceiling cover 50 covers upper parts of the ceiling structure 41 and the support structure 30. As shown in FIGS. 2 and 3, the ceiling cover 50 includes a cover body 51, a cover side-edge portion 52, a cover front-edge portion 53, and a cover rear-edge portion 54.

The cover body 51 has a plate shape extending along the horizontal plane. The cover body 51 is provided to cover an upper end of the ceiling structure 41 and an upper end of the support structure 30. As similar with the ceiling board 45, the cover body 51 has a shape in which a corner portion positioned at a front part and outward in the vehicle-width direction are diagonally cut out in a plan view.

The cover side-edge portion 52 is connected to an end outward in the vehicle-width direction of the cover body 51. The cover side-edge portion 52 covers the side vertical beam 42 and the rear support post 31 from their outward in the vehicle-width direction. The cover front-edge portion 53 is connected to an end on the forward side of the cover body 51. The cover front-edge portion 53 covers the front end of the front vertical beam 44 from the forward side.

The cover rear-edge portion 54 is connected to an end on the rearward side of the cover body 51. The cover rear-edge portion 54 covers the rear support post 31 and the rear cross beam 32 from their rearward side. The end outward in the vehicle-width direction of the cover rear-edge portion 54 is connected to the rear end of the cover side-edge portion 52.

The respective sizes in the vertical direction of the cover side-edge portion 52, the cover front-edge portion 53, and the cover rear-edge portion 54 are substantially equal to a vertical gap between the cover body 51 and the ceiling board 45.

An end outward in the vehicle-width direction of the front-edge portion 53 and the front end of the cover side-edge portion 52 are separated from each other. Accordingly, the corner portion positioned at the front part and outward in the vehicle-width direction of the ceiling cover 50 is opened to the outside of the ceiling cover 50.

Figure 3:
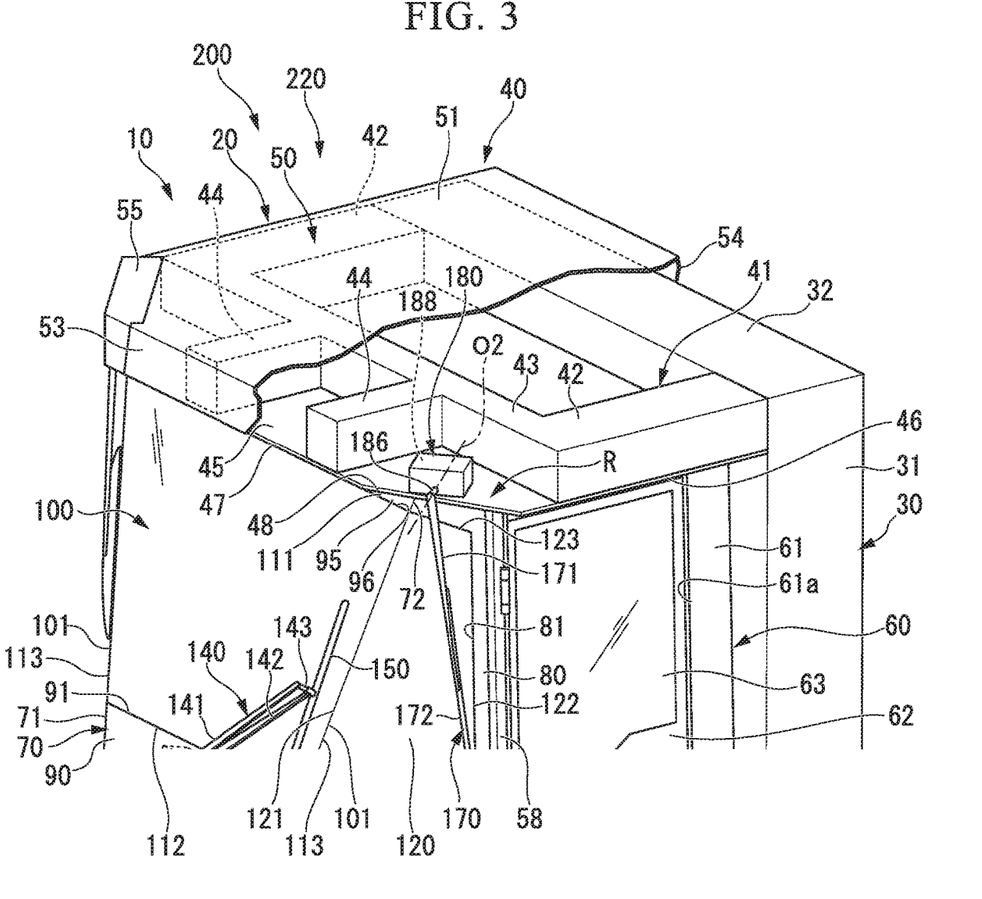
FIG. 3 is a perspective view of the cab of the work vehicle relating to the embodiment of the present invention and a partly broken-out view of a ceiling cover.

Here, as shown in FIG. 3, a housing space R is formed in the front portion and a portion outward in the vehicle-width direction of the ceiling 40. The housing space R is formed so as to be partitioned by the front cross beam 43, the front vertical beam 44, the ceiling board 45, and the ceiling cover 50. The housing space R communicates with the outside of the ceiling 40 by the opening of the ceiling cover 50. In other words, the housing space R is opened to the outside of the ceiling 40.

<Detachable Cover>

Figure 2:
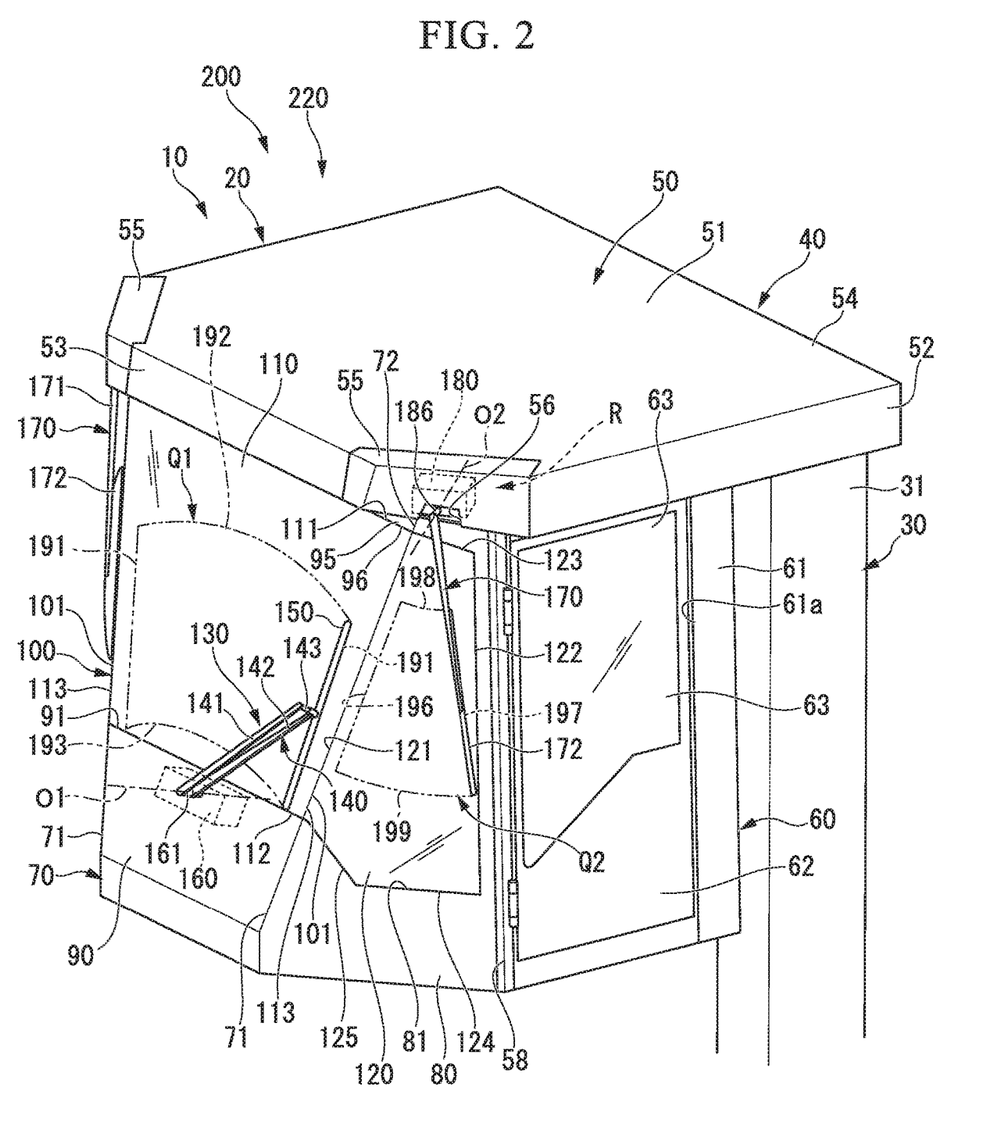
FIG. 2 is a perspective view of a cab of the work vehicle according to the embodiment of the present invention.

As shown in FIG. 2, the detachable cover 55 is detachably attached to the corner portion positioned at the front part and outward in the vehicle-width direction of the ceiling 40. The detachable cover 55 is fixed to the ceiling cover 50 of the ceiling 40 by fixing members such as bolts. The detachable cover 55 is provided so as to cover an opening of the housing space R of the ceiling 40. In a lower part of the detachable cover 55, a communication hole 56 penetrating the detachable cover 55 is formed. In a state where the detachable cover 55 is attached to the ceiling cover 50, the housing space R of the ceiling 40 is communicated with the outside of the ceiling 40 through the communication hole 56.

<Front Support Post>

The front support post 58 is member having a columnar shape extending in the vertical direction. A pair of front support posts 58 is provided at a front part of the cab body 20 with a distance being provided in the vehicle width direction. The pair of front support posts 58 extends in the vertical direction and in parallel with each other. An upper end of each front support post 58 is fixed to the corner portion positioned at the front part and outward in the vehicle-width direction of the ceiling 40. The pair of front support posts 58 supports a front part of the ceiling 40 at the both sides in the vehicle width direction. The pair of front support posts 58 is disposed at the forward side of the corresponding pair of rear support posts 31 with a distance being provided. The distance in the vehicle width direction between the pair of front support posts 58 is the same as the distance in the vehicle width direction between the pair of rear support posts 31.

<Lateral Panel>

As shown in FIG. 2, the lateral panel 60 constitutes parts on both sides in the vehicle width direction of the cab body 20. A pair of the lateral panels 60 is provided so as to partition the cockpit from the both sides in the vehicle width direction. The lateral panel 60 has a plate shape extending in the vertical direction and in the front-rear directions. A front end of the lateral panel 60 is connected to the entire range in the vertical direction of the front support post 58. A rear end of the lateral panel 60 is connected to the entire range in the vertical direction of the rear support post 31. An upper end of the lateral panel 60 is connected to the entire range in the front-rear directions of the ceiling 40.

The lateral panel 60 on the left side of the vehicle width direction is constituted by a door panel 61 and a door 62. The door panel 61 is fixed to the front support post 58, the rear support post 31, and the ceiling 40. A door frame 61a having an opening in a rectangular shape is formed at a forward part in the door panel 61. The door 62 has a plate shape extending to conform to a rectangular plate shape corresponding to the door frame 61a and is provided so as to be configure to close the opening of the door panel 61. The door 62 is provided so as to be capable of opening and closing via a hinge provided at the front end portion thereof. The operator boards on a driver's seat via the door 62. A lateral glass 63 is fitted in an upper part of the door 62.

<Front Cover>

The front cover 70 forms a front part of the cab body 20 and partitions the cockpit from the forward side of the cockpit together with the front-part window 100. The front cover 70 is provided over the left-right pair of front support posts 58. The front cover 70 is constituted by a front lateral panel 80, a front lower panel 90, and a front upper panel 95.

A pair of the front lateral panels 80 is provided so as to be separated in the vehicle width direction. The front lateral panel 80 is inclined rearward and outward as the front lateral panel 80 becoming outward in the vehicle-width direction. The front lateral panel 80 is inclined so as to spread toward the outside of the cab body 20 from the upper side to the lower side of the front lateral panel 80.

A rear end of the front lateral panel 80 extends along the vertical direction. The rear end of the front lateral panel 80 is connected to the entire range in the vertical direction of the front support post 58. The upper end of the front lateral panel 80 is connected to the ceiling 40. A front end of the front lateral panel 80 is inclined forward from the top to the bottom of the vehicle. The front end of the front lateral panel 80 is inclined inward in the vehicle-width direction from the top to the bottom of the vehicle. In the front lateral panel 80, a lateral window frame 81 is formed so as to be cut away from the front end toward the rear end side of the front lateral panel 80.

The front lower panel 90 extends in the vehicle width direction to span a lower portion of the pair of front lateral panels 80. The front lower panel 90 is connected to a lower portion of the lateral window frame 81 at the front ends of the pair of front lateral panels 80 in the vertical direction. The front lower panel 90 is inclined forward from the top to the bottom of the vehicle. The front lower panel 90 is formed so as to gradually decrease in a size in the vehicle width direction from the top to the bottom of the vehicle. The upper end of the front lower panel 90 is taken as the lower window frame 91 extending in the vehicle width direction. Ends at both sides in the vehicle width direction of the lower window frame 91 are respectively connected to an end at the lower side of the corresponding lateral window frame 81. A lower ridge line 71 formed by connecting the front lower panel 90 and the front lateral panel 80 is inclined forward toward the bottom of the vehicle and is inclined inward in the vehicle-width direction toward the bottom of the vehicle.

The front upper panel 95 extends in the vehicle width direction to span upper portions of the pair of front lateral panels 80. The front upper panel 95 is connected to the upper portion of the lateral window frame 81 at the front ends of the pair of front lateral panels 80 in the vertical direction. The front upper panel 95 is disposed so as to be separated upward from the front lower panel 90. An upper end of the front upper panel 95 is connected to the ceiling 40. A lower end of the front upper panel 95 is taken as an upper window frame 96 extending in the vehicle width direction. Ends at both sides in the vehicle width direction of the upper window frame 96 are respectively connected to an end at the upper side of the corresponding lateral window frame 81. An upper ridge line 72 formed by connecting the front lower panel 90 and the front lateral panel 80 is inclined forward toward the bottom of the vehicle and is inclined inward in the vehicle-width direction toward the bottom of the vehicle. The upper ridge line 72 and the lower ridge line 71 are positioned on the same straight line.

An opening on the forward side of the cab body 20 is partitioned by the lateral window frames 81, the lower window frame 91 and the upper window frame 96 of the front cover 70.

<Front-Part Window>

The front-part window 100 is provided so as to close the opening of the cab body 20.

The front-part window 100 includes a front windshield 110 and a front lateral windshield 120.

<Front Windshield>

The front windshield 110 is a flat glass plate extending in the vehicle width direction and in the vertical direction. In the front windshield 110, an upper-end edge 111 extending in the vehicle width direction is fitted in the upper window frame 96 of the front upper panel 95. In the front windshield 110, a lower-end edge 112 extending in the vehicle width direction is fitted in a lower window frame 91 of the front lower panel 90. The front windshield 110 is inclined forward toward the bottom of the vehicle. The front windshield 110 extends on the same plane as the front lower panel 90 and the front upper panel 95.

Side-end edges 113 which are the ends at both sides in the vehicle width direction of the front windshield 110 are inclined forward and inward in the vehicle-width direction toward the bottom of the vehicle. Each side-end edge 113 of the front windshield 110 extends on the same straight line as the lower ridge line 71 and the upper ridge line 72. The front windshield 110 becomes close to each other while a left-right pair of side-end edges 113 extends downward. That is, the front windshield 110 has a shape such that a distance in the vehicle width direction gradually narrows to the bottom of the front windshield 110 in the planar direction.

<Front Lateral Windshield>

Figure 4:
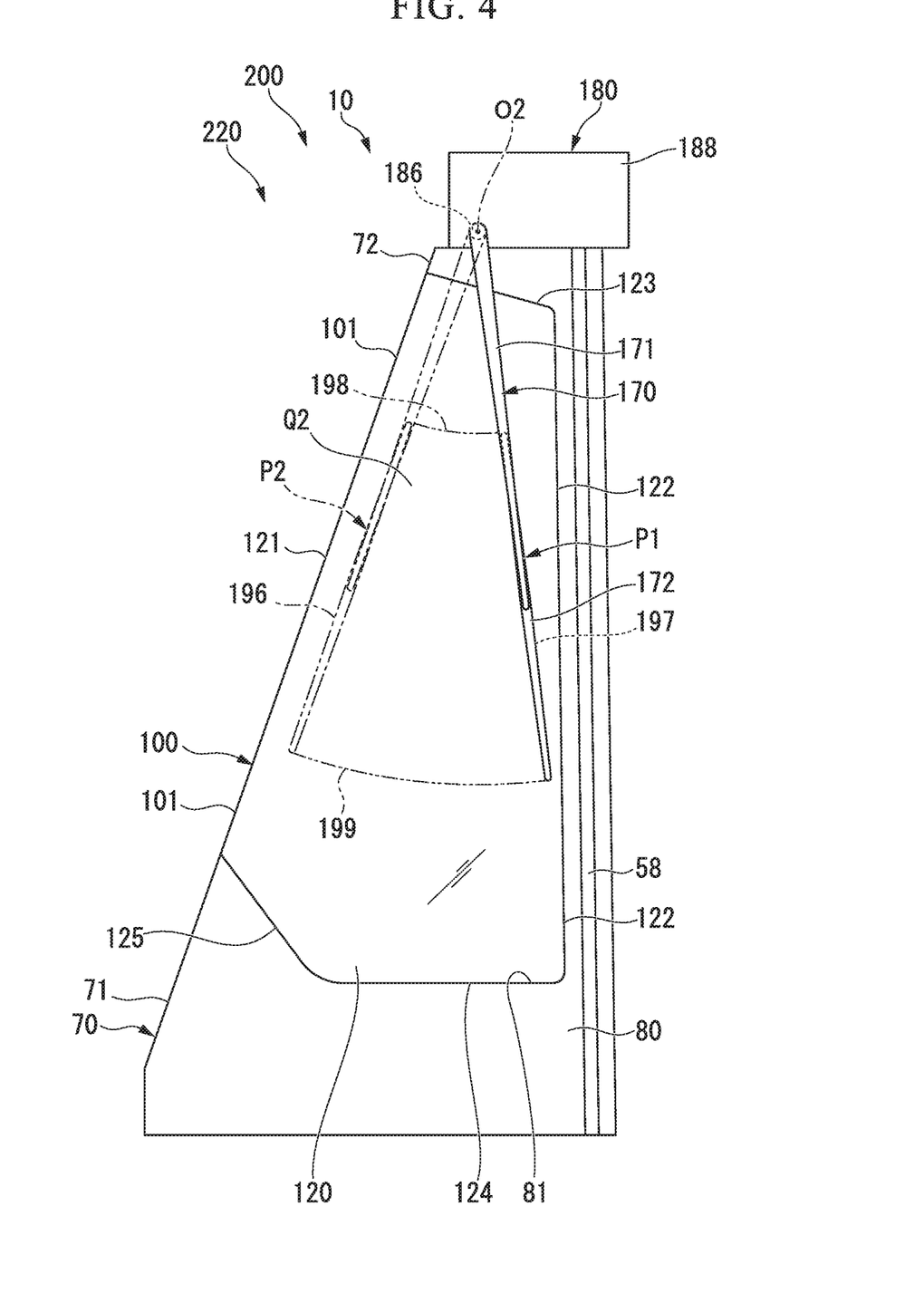
FIG. 4 is a view showing the vicinity of a front lateral windshield, an upper drive device, and a front lateral wiper in the cab of the work vehicle according to the embodiment of the present invention.

As shown in FIG. 4, the front lateral windshield 120 is a glass that has a flat plate shape extending on the same plane of the front lateral panel 80 and that is fitted to the lateral window frame 81 of the front lateral windshield 120. A left-right pair of the front lateral windshields 120 that each correspond to the lateral window frame 81 of the front lateral panel 80 is provided. The front lateral windshield 120 is connected to the side-end edge 113 of the front windshield 110 and extends diagonally rearward from the side-end edge 113. That is, the front lateral windshield 120 extends diagonally from the side-end edges 113 at both left and right ends of the front windshield 110 to the rearward side while extending outward in the vehicle-width direction. The front lateral windshield 120 extends to the outside of the cab body 20 from the top to the bottom of the vehicle.

A front-end edge 121 of the front lateral windshield 120 is connected to an end outward in the vehicle-width direction of the front windshield 110 in the entire range in the vertical direction. A ridge line 101 formed by connecting the front-end edge 121 of the front lateral windshield 120 and the side-end edge 113 of the front windshield 110 so as to be in contact with or overlap with each other extends to be inclined inward in the vehicle-width direction while extending downward, also extends so as to incline forward while extending downward. That is, the ridge line 101 extends in the same inclination angle as the upper ridge line 72 and the lower ridge line 71.

A rear-end edge 122 of the front lateral windshield 120 extends in the vertical direction. The rear-end edge 122 of the front lateral windshield 120 extends along the rear end of the front lateral panel 80 and the front support post 58.

Here, in the present embodiment, since the front-end edge 121 of the front lateral windshield 120 is inclined forward and inward in the vehicle-width direction while extending downward, the front-end edge 121 and the rear-end edge 122 of the front lateral windshield 120 respectively extending linearly are gradually separated from the top to the bottom of the vehicle. That is, the front lateral windshield 120 has a shape that spreads downward.

The upper end of the front-end edge 121 and the upper end of the rear-end edge 122 of the front lateral windshield 120 are connected by an upper-end edge 123 of the front lateral windshield 120. The upper-end edge 123 is inclined downward from the front-end edge 121 toward the rear-end edge 122.

At the lower end of the rear-end edge 122 of the front lateral windshield 120, a lower-end edge 124 extending in parallel with the lower end of the front lateral panel 80 from the lower end of the rear-end edge 122 toward the front-end edge 121 is formed. An end on the side opposite to the connection point with the rear-end edge 122 in the lower-end edge 124 is connected to a lower end of the front-end edge 121 via an inclined edge 125. The inclined edge 125 is inclined upward from the lower-end edge 124 toward the front-end edge 121.

<Font Wiper>

As shown in FIG. 2, the front wiper 130 is provided so as to be capable of wiping a surface of the front windshield 110. The front wiper 130 is disposed below the front windshield 110 and provided so as to be rotatable around a lower axis O1 extending in the front-rear directions. The lower axis O1 is disposed at a center of the front windshield in the vehicle width direction. The front wiper 130 includes a front wiper arm 140 and a front wiper blade 150 linked to the front wiper arm 140.

The front wiper arm 140 extends upward from the lower axis O1 in a radial direction of a virtual circle centered on the lower axis O1. The front wiper arm 140 is a so-called parallel link arm constituting a parallel link mechanism. The front wiper arm 140 includes a drive link 141, a driven link 142, and a connection link 143.

The drive link 141 is a link driven around the lower axis O1 and extends upward. The driven link 142 is a link provided so as to be rotatable around an axis adjacent to the lower axis O1 and extends upward so as to be parallel to the drive link 141. The connection link 143 is a link which connects each of the upper ends of the drive link 141 and the driven link 142, and is connected so as to be rotatable respectively to the drive link 141 and the driven link 142.

The front wiper blade 150 is connected to the connection link 143 at an upper end of the front wiper arm 140. The front wiper blade 150 is provided so as to extend in the vertical direction and is in contact with the front windshield 110 via a wiper rubber (not shown). The front wiper blade 150 is entirely in contact with the front windshield 110 in the vertical direction.

When the front wiper arm 140 rotates, that is, when the drive link 141 and the driven link 142 rotate, a posture of the connection link 143 does not change substantially.

Therefore, a posture of the front wiper blade 150 when the front wiper arm 140 rotates is also maintained. As a result, the front wiper blade 150 moves according to a rotation of the front wiper arm 140 while maintaining the posture extending in the vertical direction.

<Lower Drive Device>

The lower drive device 160 reciprocally rotates the front wiper arm 140. The lower drive device 160 reciprocally rotates the drive link 141 of the front wiper arm 140 around the lower axis O1. The lower drive device 160 is provided inside the front cover 70. The lower drive device 160 reciprocally rotates a lower drive shaft 161 which extends along the lower axis O1 so as to penetrate the front cover 70, thereby reciprocally rotating the drive link 141 of the front wiper arm 140 connected to the lower drive shaft 161. As a result, the front wiper blade 150 connected to the connection link 143 of the front wiper arm 140 reciprocally rotates while maintaining the posture extending in the vertical direction between the left-right pair of side-end edges 113 of the front windshield 110, that is, between the ridge lines 101 of the left-right pair of front lateral windshields 120. The front wiper blade 150 extends in substantially parallel with the corresponding ridge line 101 at a position of a reciprocating end around the lower axis O1.

<Wiping Range of Front Windshield>

As shown in FIG. 2, a wiping range Q1 of the front windshield 110 by the front wiper 130 is defined by a surrounded range with a left-right pair of side edges 191, an upper edge 192 and a lower edge 193. That is, the range is the moving range of the wiper rubber (not shown) connected to the front wiper blade 150. Each side edge 191 corresponds to the front wiper 130 positioned at the reciprocating end and extends substantially parallel to the side-end edge 113 of the front windshield 110. The upper edge 192 connects each of the upper ends of the pair of side edges 191 together and forms an arc shape which is convex upward. An upper-end position of said arc is a center of the front windshield in the vehicle width direction. The lower edge 193 connects each of the lower edges 193 of the pair of side edges 191 together and forms an arc shape which is convex upward. A curvature radius of the upper edge 192 and a curvature radius of the lower edge 193 are substantially the same.

Since the lower axis O1 which is a rotation axis of the front wiper 130 is positioned below the front windshield 110, the wiping range Q1 of the front wiper 130 is particularly easy to configure in a large range at a lower part of the front windshield 110.

<Front Lateral Wiper>

As shown in FIG. 2 and FIG. 4, the front lateral wiper 170 is provided so as to capable of wiping a surface of the front lateral windshield 120. The front lateral wiper 170 is provided so as to be rotatable around the upper axis O2 disposed above the front lateral windshield 120 and extending in the front-rear directions. The upper axis O2 is disposed at a position closer to the front-end edge 121 (the ridge line 101) than the rear-end edge 122 of the front lateral windshield 120. The front lateral wiper 170 is provided so as to be suspended from the top to the bottom of the vehicle.

The front lateral wiper 170 includes a front lateral wiper arm 171 and a front lateral wiper blade 172.

The front lateral wiper arm 171 is a so-called single arm. The front lateral wiper arm 171 is provided such that the upper end thereof is rotatable around the upper axis O2 and has a bar shape extending downward along a radial direction of a virtual circle centered on the upper axis O2.

The front lateral wiper blade 172 is connected to a tip which is a lower end of the front lateral wiper arm 171. Similarly to the front lateral wiper arm 171, the front lateral wiper blade 172 extends in the vertical direction and in a radial direction of a virtual circle centered on the upper axis O2. The front lateral wiper blade 172 is in contact with the front lateral windshield 120 from the outside via the wiper rubber (not shown). The front wiper blade 150 is entirely in contact with the front lateral windshield 120 in the radial direction of the upper axis O2.

<Upper Drive Device>

An upper drive device 180 causes the front lateral wiper arm 171 a reciprocally rotation around the upper axis O2. As shown in the schematic diagram of FIG. 5 in detail, the upper drive device 180 includes an electric motor 181, a transmission device 182 and a drive circuit 187.

Figure 5:
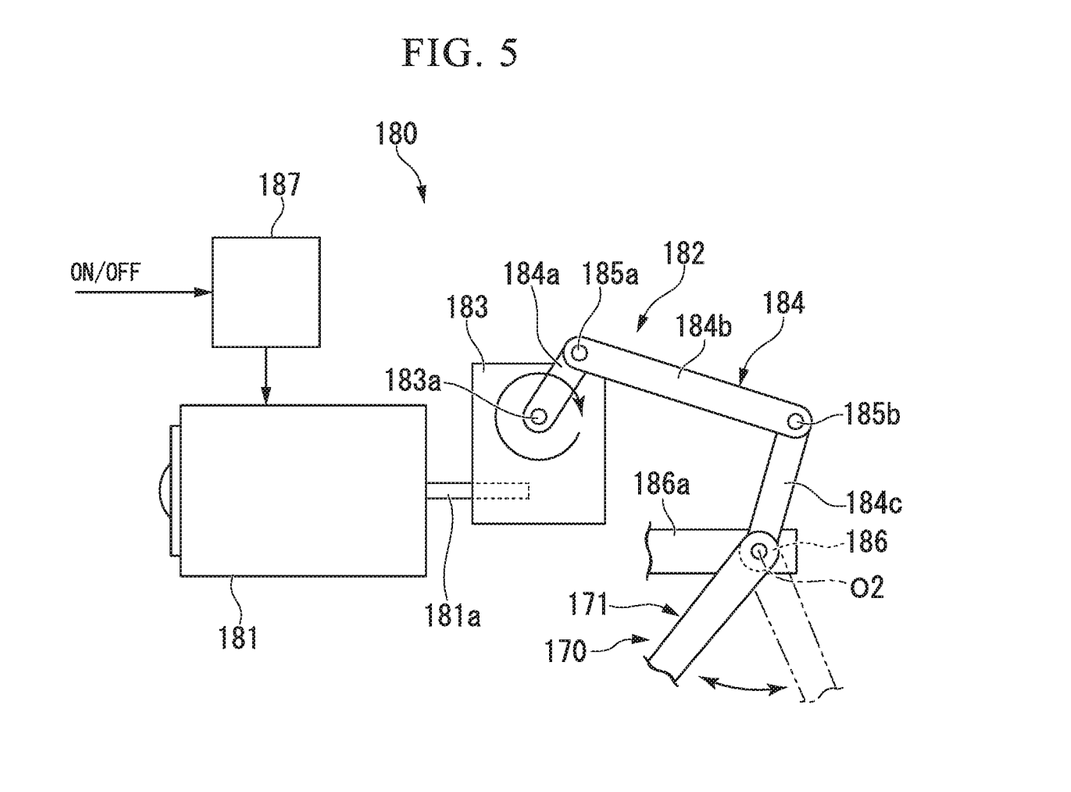
FIG. 5 is a schematic diagram showing a schematic configuration of the upper drive device in the cab of the work vehicle according to the embodiment of the present invention.

The electric motor 181 is rotationally driven according to current supplied from the drive circuit 187.

The transmission device 182 converts a rotational motion of the electric motor 181 into a swinging motion and transmits it to the front lateral wiper 170. The transmission device 182 of the present embodiment is constituted by a worm speed reducer 183 and lever crank mechanism 184. The lower drive device 160 may also have the same structure as the upper drive device 180.

The worm speed reducer 183 converts the rotational motion of an output shaft 181a of the electric motor 181 to the rotational motion around an axis orthogonal to the output shaft 181a via a worm gear, and at the same time, outputs power by reducing the rotational speed to a predetermined value via a reduction gear.

The lever crank mechanism 184 is a link mechanism for converting the rotational motion of an output shaft 183a of the worm speed reducer 183 into the swinging motion. The lever crank mechanism 184 includes a first link 184a, a second link 184b, a third link 184c, and an upper drive shaft 186.

A first end of the first link 184a is connected to the output shaft 183a of the worm speed reducer 183 and rotates according to the output shaft 183a of the worm speed reducer 183. A first end of the second link 184b is rotatably connected to a second end of the first link 184a via a pin 185a. A first end of the third link 184c is connected to a second end of the second link 184b via a pin 185b. A second end of the third link 184c is connected to the upper drive shaft 186 provided so as to be rotatable around the upper axis O2 with respect to the bracket 186a. A base end portion of the front lateral wiper arm 171 of the front lateral wiper 170 is connected to the upper drive shaft 186.

According to the above configuration, the upper drive shaft 186 swings around the upper axis O2 according to the rotation of the output shaft 183a of the worm speed reducer 183. Therefore, the front lateral wiper arm 171 supported by the upper drive shaft 186 also reciprocally rotates around the upper axis O2 together with the upper drive shaft 186.

The front lateral wiper 170 is reciprocally rotated by the upper drive device 180 between a rear position P1 (which is indicated by a solid line in FIG. 4) where the front lateral wiper blade 172 comes along the rear-end edge 122 of the front lateral windshield 120 and a front position P2 (which is indicated by a dash line in FIG. 4) where the front lateral wiper blade 172 comes along the front-end edge 121 of the front lateral windshield 120.

Here, as described above, the upper axis O2 is closer to the front-end edge 121 than the rear-end edge 122 of the front lateral windshield 120. Therefore, an angle formed by the front lateral wiper 170 of the front position P2 and the front-end edge 121 (the ridge line 101) of the front lateral windshield 120 is smaller than an angle formed by the front lateral wiper 170 of the rear position P1 and the rear-end edge 122 of the front lateral windshield 120. In particular, in the present embodiment, the front lateral wiper blade 172 of the front lateral wiper 170 of the rear position P1 is inclined with respect to the rear-end edge 122 of the front lateral windshield 120, whereas the front lateral wiper blade 172 of the front lateral wiper 170 of the front position P2 is arranged in parallel with the front-end edge 121 of the front lateral windshield 120.

The drive circuit 187 is a circuit for driving the electric motor 181. In the drive circuit 187, an ON command is inputted by turning on, for example, a wiper switch provided in the cockpit. The drive circuit 187 supplies current to the electric motor 181 from a power source such as a battery based on the ON command.

An OFF command is input to the drive circuit 187 by turning off the wiper switch.

When the OFF command is input, the drive circuit 187 stops the reciprocating rotation of the front lateral wiper 170 with the rear position P1 setting as an automatic stop position. The automatic stop position is a predetermined setting position where the front lateral wiper 170 is configured to be stopped at the position thereof.

That is, the drive circuit 187 continuously supplies current to the electric motor 181 so as to continue an operation of the reciprocating rotation until the front lateral wiper 170 moves to the rear position P1 even when the OFF command is input at the time when the front lateral wiper 170 is positioned at a position other than the rear position P1.

As shown in FIGS. 2 and 3, such upper drive device 180 is disposed in the housing space R of the ceiling 40 in a state of being housed in a case 188. In the present embodiment, the upper drive device 180 is fixedly installed on the upper surface of the ceiling board 45. The upper drive shaft 186 of the upper drive device 180 protrudes to the outside of the housing space through a communicating portion of the detachable cover 55. The front lateral wiper arm 171 of the front lateral wiper 170 is connected to a protruding portion of the upper drive shaft 186.

<Wiping Range of Front Lateral Windshield>

As shown in FIGS. 2 and 4, a wiping range Q2 of the front lateral windshield 120 according to the front lateral wiper 170 is defined by a surrounded range with a front edge 196, a rear edge 197, an upper edge 198 and a lower edge 199. That is, the range is a moving range of the wiper rubber (not shown) connected to the front lateral wiper blade 172.

The front edge 196 corresponds to a reciprocating end on the front side of the front lateral wiper 170 and extends along the front-end edge 121 (the ridge line 101) of the front lateral windshield 120. In the present embodiment, the front edge 196 extends in parallel with the front-end edge 121 of the front lateral windshield 120. The rear edge 197 corresponds to another reciprocating end on the rear side of the front lateral wiper 170 and extends along the rear-end edge 122 of the front lateral windshield 120. In the present embodiment, the rear edge 197 extends diagonally so as to be gradually close to the rear-end edge 122 of the front lateral windshield 120 while extending downward. In addition, the wiper driving device 180 and the rear position P1 may be set so that the rear edge 197 becomes in parallel with the rear-end edge 122 of the front lateral windshield 120.

The upper edge 198 corresponds to a rotational locus at the upper end of the front lateral wiper blade 172 in the front lateral wiper 170 and has an arc shape centered on the upper axis O2. The lower edge 199 corresponds to a rotational locus at the lower end of the front lateral wiper blade 172 in the front lateral wiper 170 and has an arc shape centered on the upper axis O2. A curvature radius of lower edge 199 is larger than a curvature radius of upper edge 198.

Since the lower axis O1 which is the rotation axis of the front lateral wiper 170 is positioned above the front lateral windshield 120, the wiping range Q2 of the front lateral wiper 170 is easy to be configured in a wide range in particular on the upper side of the front lateral windshield 120.

The front edge 196 and the rear edge 197 of the wiping range Q2 of the front lateral windshield 120 are separated from each other from upward to downward thereof, in other words, the wiping range Q2 has a shape that spreads downward.

Figure 6:
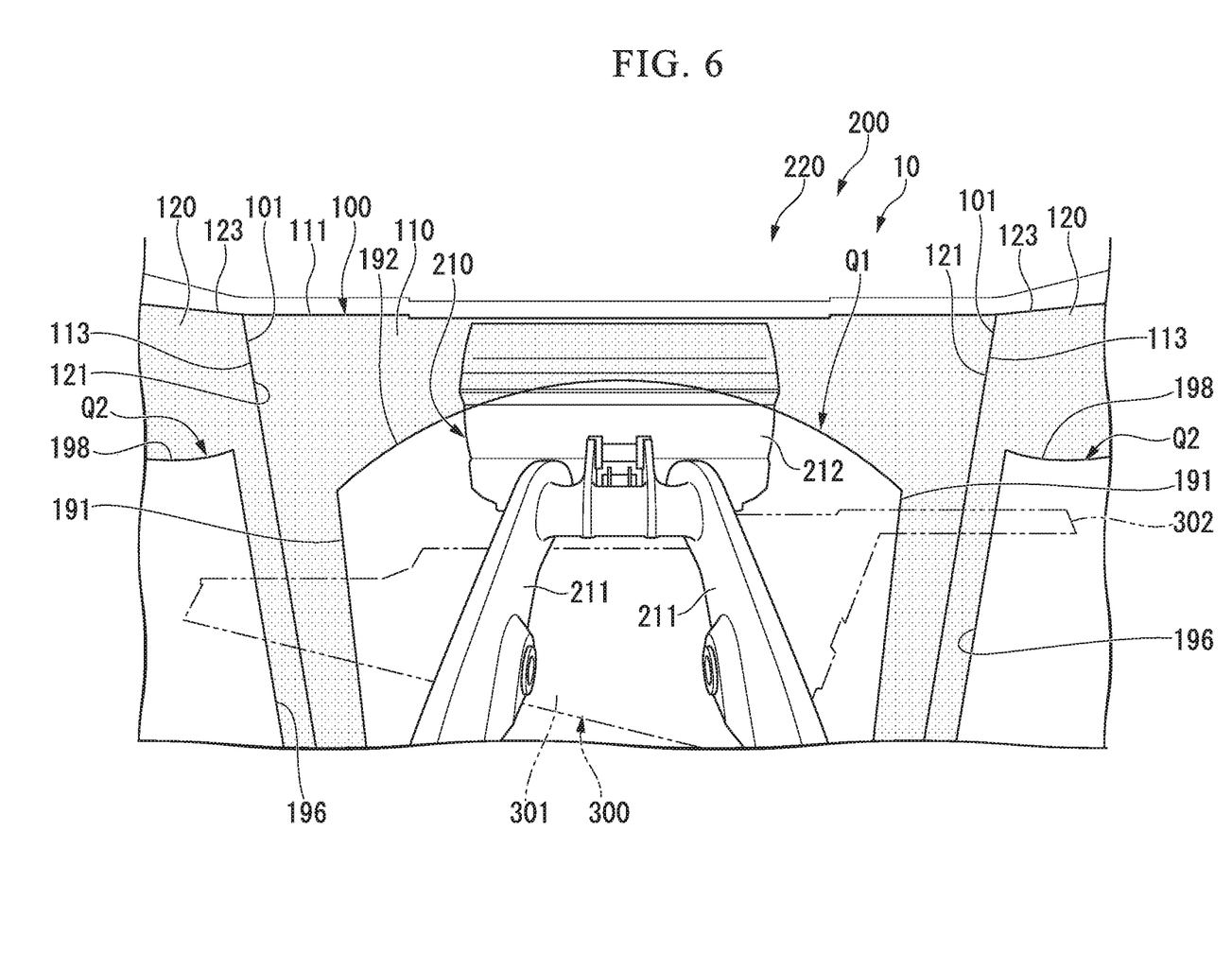
FIG. 6 is a view showing visibility for the operator at the time of earth unloading work in the work vehicle according to the embodiment of the present invention.

As shown in FIGS. 2 and 6, an upper-end position of the front edge 196 of the wiping range Q2 of the front lateral wiper 170 is positioned upper than an upper-end position of the side edge 191 of the wiping range Q1 of the front wiper 130. The upper-end position of the front edge 196 of the wiping range Q2 of the front lateral wiper 170 is positioned lower than the uppermost-end position of the upper edge 192 of the wiping range Q1 of the front wiper 130.

<Effect>

When the operator operates the wheel loader 200 in the driver's seat, the operator visually recognizes the front periphery through the front-part window 100 configured by the front windshield 110 and the front lateral windshield 120. For example, when it is bad weather such as rainy weather or condensation occurs on an outer surface the front-part window 100, or when visibility gets worse because of adhering dust on the front-part window 100, the front windshield 110 and the front lateral windshield 120 are wiped by the front wiper 130 and the front lateral wiper 170.

In the present embodiment, the front-end edge 121 and the rear-end edge 122 of the front lateral windshield 120 has a shape spreading outward while extending downward. Correspondingly, also the wiping range Q2 of the front lateral windshield 120 by the front lateral wiper 170 has a shape that spreading outward while extending downward. That is, since it is possible to form the wiping range Q2 corresponding to the shape of the front lateral windshield 120 by the front lateral wiper 170, it is possible to ensure a large visibility for the operator through the front lateral windshield 120.

In contrast, for example, if the rotation axis of the front lateral wiper 170 is arranged downward or rearward the front lateral windshield 120, the wiping range of the front lateral wiper 170 does not conform to the shape of the front lateral windshield 120. Therefore, it is impossible to secure a sufficient visibility for the operator in bad weather, or the like. In the present embodiment, the rotation axis (upper axis O2) of the front lateral wiper 170 is disposed above the front lateral windshield 120 thereby a rotational zone of the front lateral wiper 170 is capable of conforming to the shape of the front lateral windshield 120. As a result, it is possible to wipe efficiently the front lateral windshield 120 by the front lateral wiper 170 with a minimal rotational range.

In the present embodiment, the automatic stop position of the front lateral wiper 170 is the rear position P1 when the front lateral wiper 170 is positioned along the rear-end edge 122 of the front lateral windshield 120. Therefore, the front lateral wiper 170 positioned at the automatic stop position can suppress from blinding visibility for operator. Therefore, even when the front lateral wiper 170 is not in use, it is possible to ensure a large visibility for the operator.

The front lateral wiper blade 172 of the front lateral wiper 170 is parallel with a front-end edge 121 of the front lateral windshield 120 at the front position P2 which is the forward side of the reciprocating end. Therefore, the wiping range Q2 of the front lateral wiper 170 is possible to be brought close to the same as the entire range in vertical direction of the front-end edge 121 of the front lateral windshield 120. Therefore, it is possible to uniform visibility in vertical direction in the vicinity of the front-end edge 121. Thus, the operator can visually recognize a forward view without feeling discomfort in the vertical direction. Thus it is possible to improve the workability.

The upper drive device 180 driving the front lateral wiper 170 can be accessed by removing the detachable cover 55 which is fixed detachably to the ceiling cover 50 of the ceiling 40. Therefore, it is possible to improve the maintainability for the upper drive device 180.

The upper drive device 180 is disposed inside the housing space R of the ceiling 40 and the housing space R uses a free space of the corner of the ceiling 40, and thus, it is not necessary to separately build a space to provide the upper drive section 180.

Since a housing section of the ceiling 40 is an the area surrounded by the front vertical beam 44 and the front cross beam 43 of the ceiling structure 41, it is possible to prevent from impact being directly reaching the upper drive device 180 when, for example, impact is given to the ceiling 40. That is, it is possible to protect the upper drive device 180 from impact from the outside.

Here, as shown in FIG. 6, when the operator performs stowing of the crushed stone, and the like, in a vessel 301 of a dump truck 300 using the work equipment 210 of the wheel loader 200, the operator tends to visually recognize in a careful manner a protector 302 of a front part of the vessel 301 and a rear part of the vessel 301. Therefore, it is necessary to secure visibility in a middle part to an upper part in the vertical direction of the front lateral windshield 120. In the present embodiment, since the rotation axis of the front lateral wiper 170 is positioned above the front lateral wiper 170, it is possible to easily form the wiping range Q2 especially at the middle part to the upper part of the front lateral wiper 170.

In the present embodiment, in particular, the upper-end position of the front edge 196 of the wiping range Q2 of the front lateral wiper 170 is positioned upper than the upper-end position of the side edge 191 of the wiping range Q1 of the front wiper 130. Therefore, it is possible to secure a large visibility, especially in a lateral part, for the operator. Therefore, it is possible to improve the workability of the operator to stow crushed stone, or the like, in the dump truck 300.

<Other Embodiments>

In the above description, exemplarily embodiments of the present invention are explained, but the present invention is not limited thereto, and the present invention can be appropriately changed without departing from the technical idea of the invention.

For example, in the present embodiment, the upper drive device 180 is disposed inside the ceiling 40; however, it is not limited thereto. The upper axis O2 which is a rotation axis of the front lateral wiper 170 may be disposed above the front lateral windshield 120. For example, the upper axis O2 may be provided in the front lateral panel 80.

In the present embodiment, it is assumed that the front lateral wiper 170 of the front position P2 is disposed in parallel with the front-end edge 121 (the ridge line 101) of the front lateral windshield 120; however it is not limited thereto. A large visibility is preferably able to be secured at the front-end edge 121 side rather than the rear-end edge 122 side of the front lateral windshield 120. Therefore, an angle formed by the front lateral wiper 170 of the front position P2 and the front-end edge 121 (the ridge line 101) of the front lateral windshield 120 may be smaller than an angle formed by the front lateral wiper 170 of the rear position P1 and the rear-end edge 122 of the front lateral windshield 120. Incidentally, the angle formed by the front lateral wiper 170 of the front position P2 and the front-end edge 121 (the ridge line 101) of the front lateral windshield 120 may be the same as the angle formed by the front lateral wiper 170 of the rear position P1 and the rear-end edge 122 of the front lateral windshield 120.

In the present embodiment, the front wiper arm 140 of the front wiper 130 is a parallel link arm, however, it may be a single arm as similar to the front lateral wiper 170.

In the present embodiment, an example has been described of applying the cab 10 to the wheel loader 200; however, other the work vehicle for example, a bulldozer, a dump truck, or the motor grader, may be applied.

INDUSTRIAL APPLICABILITY

According to the cab of the work vehicle and the work vehicle of the above embodiment, it is possible to improve visibility for the operator through the front lateral windshield.

BRIEF DESCRIPTION OF THE REFERENCE SYMBOLS

10: Cab, 20: Cab body, 30: Support structure, 31: Rear support, 32: Rear cross beam, 40: Ceiling, 41: Ceiling structure, 42: Side longitudinal beam, 43: Front cross beam, 44: Front longitudinal beam, 45: Ceiling board, 46: Side edge portion, 47: Front edge, 48: Inclined edge, 50: Ceiling cover, 51: Cover body, 52: Cover side-edge portion, 53: Cover front-edge portion, 54: Cover rear-edge portion, 55: Detachable cover, 56: Communication hole, 58: Front support post, 60: Lateral panel post, 61: Door panel, 61a: Door frame, 62: Door, 63: Lateral glass, 70: Front cover, 71: Lower ridgeline, 72: Upper ridgeline, 80: Front lateral panel, 81: Lateral window frame, 90: Front lower panel, 91: Lower window frame, 95: Front upper panel, 96: Upper window frame, 100: Front window, 101: Ridgeline, 110: Front windshield, 111: Upper-end edge, 112: Lower-end edge, 113: Side-end edge, 120: Front lateral windshield, 121: Front-end edge, 122: Rear-end edge, 123: Upper-end edge, 124: Lower-end edge, 125: Inclined edge, 130: Front wiper, 140: Front wiper arm, 141: Drive link, 142: Driven link, 143: Connection link, 150: Front wiper blade, 160: Lower drive device, 161: Lower drive shaft, 170: Front lateral wiper, 171: Front lateral wiper arm, 172: Front lateral wiper blade, 180: Upper drive device, 181: Electric motor, 181a: Output shaft, 182: Transmission device, 183: Worm speed reducer, 183a: Output shaft, 184: Lever crank mechanism, 184a: First link, 184b: Second link, 185a: Pin, 184c: Third link, 185b: Pin, 186: Upper drive shaft, 186a: Bracket, 187: Drive circuit, 188: Case, 191: Side edge, 192: Upper edge, 193: Lower edge, 196: Front edge, 197: Rear edge, 198: Upper edge, 199: Lower edge, 200: Wheel loader (work vehicle), 210: Work equipment, 211: Boom, 212: Bucket, 213: Link, 214: Bell crank, 215: Boom driving cylinder, 216: Bucket drive cylinder, 220: Vehicle body, 230: Front wheel, 240: Rear wheel, 250: Vehicle front portion, 260: Vehicle rear portion, 270: Rear frame, 271: Fuel tank, 272: Engine room, 280: Passage forming portion, 281: Front passage, 290: Passage fence, 300: Dump truck, 301: Vessel, 302: Protector, O1: Lower axis, O2: Upper axis, P1: Rear position, P2: Front position, R: Housing space, Q1: Wiping range of front windshield, Q2: Wiping range of front lateral windshield

The invention claimed is:

1. A cab of a work vehicle in which an inside thereof is a cockpit comprising:
   a front windshield that extends in a vehicle width direction;
   front lateral windshields that extend diagonally rearward and are connected to both sides of the front windshield in the vehicle width direction via ridgelines, and a rear-end edge of each front lateral windshield extending in a vertical direction being gradually separated from the ridgeline of each front lateral windshield while extending downward;
   a front lateral wiper that is disposed so as to be rotatable around an upper axis that is disposed above each front lateral windshield and so as to be rotatable along each front lateral windshield, and that is configured to wipe each front lateral windshield;
   an upper drive device that is configured to reciprocally rotate the front lateral wiper around the upper axis between a rear position in which the front lateral wiper extends along the rear-end edge and a front position in which the front lateral wiper extends along the ridgeline.

2. The cab of the work vehicle according to claim 1, wherein
   the upper drive device is configured to perform a reciprocating rotation of the front lateral wiper when an ON command is input, and is configured to stop the reciprocating rotation of the front lateral wiper at the rear position set as an automatic stop position when an OFF command is input.

3. The cab of the work vehicle according to claim 1, wherein
   a first angle formed by the front lateral wiper when at the front position and the ridgeline is less than a second angle formed by the front lateral wiper when at the rear position and the rear-end edge.

4. The cab of the work vehicle according to claim 1, further comprising:
   a ceiling that partitions the cockpit from above and forms a housing space that opens to the outside at a front portion and a corner outward in the vehicle-width direction,
   wherein the upper drive device is disposed in the housing space.

5. The cab of the work vehicle according to claim 1, further comprising:
   a front wiper that is disposed so as to be rotatable around a lower axis disposed below the front windshield and so to be rotatable along the front windshield and is configured to wipe the front windshield; and
   a lower drive device that is configured to perform a reciprocating rotation of the front wiper around the lower axis between a pair of the ridgelines at both sides in the vehicle width direction,
   wherein an upper-end position of a front edge along the ridgeline in a wiping range of the front lateral wiper is positioned above an upper-end position of a side edge along the ridgeline in the wiping range of the front-wiper.

6. A work vehicle comprising:
   a vehicle body having the cab of the work vehicle according to claim 1, and
   a work equipment provided on a forward side of the cab in the vehicle body.

7. The cab of the work vehicle according to claim 2, wherein a first angle formed by the front lateral wiper when at the front position and the ridgeline is less than a second angle formed by the front lateral wiper when at the rear position and the rear-end edge.

8. The cab of the work vehicle according to claim 2, further comprising:
a ceiling that partitions the cockpit from above and forms a housing space that opens to the outside at a front portion and a corner outward in the vehicle-width direction,
wherein the upper drive device is disposed in the housing space.

9. The cab of the work vehicle according to claim 3, further comprising:
a ceiling that partitions the cockpit from above and forms a housing space that opens to the outside at a front portion and a corner outward in the vehicle-width direction,
wherein the upper drive device is disposed in the housing space.

10. The cab of the work vehicle according to claim 7, further comprising:
a ceiling that partitions the cockpit from above and forms a housing space that opens to the outside at a front portion and a corner outward in the vehicle-width direction,
wherein the upper drive device is disposed in the housing space.

11. The cab of the work vehicle according to claim 2, further comprising:
a front wiper that is disposed so as to be rotatable around a lower axis disposed below the front windshield and so to be rotatable along the front windshield and is configured to wipe the front windshield; and
a lower drive device that is configured to perform a reciprocating rotation of the front wiper around the lower axis between a pair of the ridgelines at both sides in the vehicle width direction,
wherein an upper-end position of a front edge along the ridgeline in a wiping range of the front lateral wiper is positioned above an upper-end position of a side edge along the ridgeline in the wiping range of the front-wiper.

12. The cab of the work vehicle according to claim 3, further comprising:
a front wiper that is disposed so as to be rotatable around a lower axis disposed below the front windshield and so to be rotatable along the front windshield and is configured to wipe the front windshield; and
a lower drive device that is configured to perform a reciprocating rotation of the front wiper around the lower axis between a pair of the ridgelines at both sides in the vehicle width direction,
wherein an upper-end position of a front edge along the ridgeline in a wiping range of the front lateral wiper is positioned above an upper-end position of a side edge along the ridgeline in the wiping range of the front-wiper.

13. The cab of the work vehicle according to claim 4, further comprising:
a front wiper that is disposed so as to be rotatable around a lower axis disposed below the front windshield and so to be rotatable along the front windshield and is configured to wipe the front windshield; and
a lower drive device that is configured to perform a reciprocating rotation of the front wiper around the lower axis between a pair of the ridgelines at both sides in the vehicle width direction,
wherein an upper-end position of a front edge along the ridgeline in a wiping range of the front lateral wiper is positioned above an upper-end position of a side edge along the ridgeline in the wiping range of the front-wiper.

14. The cab of the work vehicle according to claim 7, further comprising:
a front wiper that is disposed so as to be rotatable around a lower axis disposed below the front windshield and so to be rotatable along the front windshield and is configured to wipe the front windshield; and
a lower drive device that is configured to perform a reciprocating rotation of the front wiper around the lower axis between a pair of the ridgelines at both sides in the vehicle width direction,
wherein an upper-end position of a front edge along the ridgeline in a wiping range of the front lateral wiper is positioned above an upper-end position of a side edge along the ridgeline in the wiping range of the front-wiper.

15. The cab of the work vehicle according to claim 8, further comprising:
a front wiper that is disposed so as to be rotatable around a lower axis disposed below the front windshield and so to be rotatable along the front windshield and is configured to wipe the front windshield; and
a lower drive device that is configured to perform a reciprocating rotation of the front wiper around the lower axis between a pair of the ridgelines at both sides in the vehicle width direction,
wherein an upper-end position of a front edge along the ridgeline in a wiping range of the front lateral wiper is positioned above an upper-end position of a side edge along the ridgeline in the wiping range of the front-wiper.

16. A work vehicle comprising:
a vehicle body having the cab of the work vehicle according to claim 2, and
a work equipment provided on a forward side of the cab in the vehicle body.

17. A work vehicle comprising:
a vehicle body having the cab of the work vehicle according to claim 3, and
a work equipment provided on a forward side of the cab in the vehicle body.

18. A work vehicle comprising:
a vehicle body having the cab of the work vehicle according to claim 4, and
a work equipment provided on a forward side of the cab in the vehicle body.

19. A work vehicle comprising:
a vehicle body having the cab of the work vehicle according to claim 5, and
a work equipment provided on a forward side of the cab in the vehicle body.

20. A work vehicle comprising:
a vehicle body having the cab of the work vehicle according to claim 7, and
a work equipment provided on a forward side of the cab in the vehicle body.

* * * * *